United States Patent Office 3,404,148
Patented Oct. 1, 1968

3,404,148
PREPARATION OF ω-LAURINOLACTAM
Johan W. Garritsen, Geleen, Netherlands, assignor to Stamicarbon N.V., Heerlen, Netherlands
No Drawing. Filed Feb. 17, 1966, Ser. No. 528,097
Claims priority, application Netherlands, Feb. 17, 1965, 6501941, 6501942
9 Claims. (Cl. 260—239.3)

This invention relates to the preparation of ω-laurinolactam. More specifically, the present invention relates to the preparation of ω-laurinolactam from cyclododecanone oxime by the Beckmann rearrangement wherein the cyclododecanone oxime contains appreciable amounts of cyclododecanone.

The reaction of cyclo-aliphatic ketones with hydroxylamine to yield the corresponding oxime is well-known in the prior art. For example, caprolactam is obtained from the Beckmann rearrangement of cyclohexanone oxime, which has been prepared from cyclohexaone. In preparing cyclohexanone oxime for the rearrangement reaction, an acid aqueous solution of a hydroxylamine salt, for example, a chloride or sulphate salt, is reacted with cyclohexanone. The resulting reaction mixture is neutralized and the oxime is separated from the neutralized mixture. The cyclohexanone oxime so obtained is subsequently converted into caprolactam by the Beckmann rearrangement, generally with the aid of concentrated sulphuric acid, to which oleum may be added.

If cyclododecanone is reacted with hydroxylamine in a similar manner and the resulting cyclododecanone oxime is converted into ω-laurinolactam by the Beckmann rearrangement with the aid of concentrated sulphuric acid, difficulties are encountered which are not present in the process for producing caprolactam. The ketone is not completely converted in the reaction with hydroxylamine, so that the cyclododecanone oxime contains appreciable amounts of cyclododecanone. The rearrangement reaction is adversely affected by the presence of cyclododecanone in the oxime. The formation of laurinolactam is reduced, resulting in a lower yield, and the cyclododecanone present decomposes during the rearrangement of the oxime, thus contaminating the lactam with impurities and, incidentally losing a valuable ketone. An amount as small as 2% by weight of cyclododecanone in the oxime will cause a 2–4% reduction in the yield of laurinolactam. The prior art, for example, Belgium Patent 636,819, has taught that the oxime must contain less than 0.5% by weight of cyclododecanone to be considered useable in commercial processes. The difficulties inherent in using cyclododecanone oxime containing appreciable amounts of cyclododecanone in the prior art ω-laurinolactam process can be reduced by purifying the cyclododecanone oxime, e.g., by repeated crystallization. However, most methods of purification of cyclododecanone oxime are laborious and costly. If the cyclododecanone oxime is purified by distillation, an inadequate separation of the ketone and oxime will result while, in addition, a portion of the oxime will decompose.

Because of the difficulties encountered in the attempts to purify cyclododecanone oxime, and because of the fact that in the usual reaction of cyclododecanone with hydroxylamine the conversion into cyclododecanone oxime is incomplete, several measures have been proposed to improve the conversion of cyclododecanone into cyclododecanone oxime. For example, German Patent 1,081,884 teaches that the formation of cyclododecanone oxime in the reaction of cyclododecanone with hydroxylamine can be promoted by effecting the reaction in the presence of a water-miscible organic solvent in which the ketone is soluble. British Patent 924,656 teaches that a more favorable conversion into cyclododecanone will result if the reaction of the ketone with hydroxylamine is in an aqueous medium at a pH in the range of 3–8, and in the presence of emulsifiers.

In addition, Belgium 636,819 teaches that the conversion can be improved by effecting the reaction of ketone with hydroxylamine in an aqueous medium under the following conditions: (1) the salt concentration in the reaction mixture must be such so that at the end of the reaction at least 10% by weight of salts is contained in the reaction mixture; (2) a high reaction temperature, preferably between 50 and 150° C., and more preferably between 70 and 120° C. is used; (3) a pH of 7–14, preferably 7–12, is used; (4) optionally, and if needed, a water-immiscible inert solvent boiling above 70° C. is used.

All of the proposed measures mentioned above have the goal of achieving the highest possible conversion of the cyclododecanone into cyclododecanone oxime, so that the oxime formed will contain only a small amount of unconverted ketone.

In the United States patent application Ser. No. 505,970 of Garritsen, filed Nov. 1, 1965, is disclosed a process of preparing ω-laurinolactam from cyclododecanone oxime by reacting the oxime with hydrogen chloride in the presence of a polar organic solvent. However, that disclosure teaches the use of the purified oximes of the prior art.

It is an object of this invention to provide a process for the production of ω-laurinolactam wherein cyclododecanone oxime containing appreciable amounts of cyclododecanone may be used as the starting material. It is an additional object of this invention to provide a process for the production of laurinolactam from cyclododecanone oxime obtained by the conversion of cyclododecanone, wherein relatively low conversion rates of cyclododecanone into cyclododecanone oxime are used without requiring a subsequent purification step. Still further objectives and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

It has unexpectedly been found that the process for the preparation of ω-laurinolactam from cyclododecanone oxime, in which the oxime is brought into reaction with hydrogen chloride in the presence of a polar organic solvent, is improved and considerably simplified by using as the initial product cyclododecanone oxime is admixture with more than 0.5% by weight of cyclododecanone, thus avoiding a preliminary separation and purification of the cyclododecanone oxime.

This process produces high yields of ω-laurinolactam product, which is easily separated from the cyclododecanone. The rearrangement reaction of cyclododecanone oxime to ω-laurinolactam is not unfavorably affected by the presence of the cyclododecanone. Generally, 0.5% by weight or more of cyclododecanone may be present in the cyclododecanone oxime. Preferably, the cyclododecanone oxime contains more than 3% by weight of cyclododecanone and most preferably the cyclododecanone oxime contains more than 10% by weight of cyclododecanone. Good results may be obtained if amounts of cyclododecanone as high as 20%, 30%, 60% or higher by weight of cyclododecanone oxime are present. The cyclododecanone recirculates through the process of the present invention unchanged. The difficulties encountered in the separation of cyclododecanone from cyclododecanone oxime are not present in the separation of laurinolactam and cyclododecanone.

In the preferred embodiment of this invention, the cyclododecanone oxime which is to be reacted with hydrogen chloride is obtained by the conversion of cyclododecanone into cyclododecanone oxime with the aid of an aqueous solution of hydroxylamine to produce a mixture of cyclododecanone and cyclododecanone oxime, which is separated from the aqueous solution. The mixture of cyclododecanone and cyclododecanone oxime is subsequently converted, by reaction with hydrogen chloride in the presence of a polar organic solvent, into a mixture of cyclododecanone and ω-laurinolactam. The cyclododecanone and the ω-laurinolactam are separated to produce product ω-laurinolactam and cyclododecanone which may be recycled to be used again as the starting product of the present process.

An important advantage of the preferred embodiment of the process of the present invention is that, since the reaction of cyclododecanone with hydroxylamine is stopped as soon as the desired mixed product of cyclododecanone and cyclododecanone oxime has been obtained, it is not necessary to react the hydroxylamine under stringent reaction conditions, for example, for a period of time at an elevated temperature, such as 100° C. or greater. Reduced reaction times and lower temperatures, for example, 60 to 90° C., are preferred in the process of the present invention, thereby preventing or reducing the decomposition of hydroxylamine, although temperatures in the range of 15 to 125° C. may be used.

An additional advantage of the preferred embodiment of the process of the present invention is that it is possible to effect a complete conversion of the hydroxylamine by using less than stoichiometric amounts of hydroxylamine with respect to the amount of ketone, preferably ¼ to ¾ mole of hydroxylamine per mole of cyclododecanone, so that it is unnecessary to recycle excess hydroxylamine. Thus, the preferred process of the present invention differs from the usual preparation of oximes from cyclo-aliphatic ketones, in particular the preparation of cyclohexanone oxime from cyclohexanone, in which an excess of hydroxylamine is used to insure substantially complete conversion of ketone.

Although the degree of acidity of the aqueous hydroxylamine solution may be varied considerably in the preferred process of the present invention, preferably a pH in the range of 4–7 is used. The oxime formation proceeds more rapidly in an alkaline medium, e.g., at a pH of 8 or greater, but under these alkaline conditions greater amounts of hydroxylamine will be consumed, as the alkaline pH promotes hydroxylamine decomposition. In a strongly acid medium, especially at a pH of less than 4, the oxime formation will proceed quite slowly.

The mixture of cyclododecanone and cyclododecanone oxime obtained by the hydroxylamine reaction is present in the reaction mixture in solid form and may be separated from the reaction solution in a simple manner, e.g., by filtration or extraction. The ratio between the amounts of cyclododecanone and cyclododecanone oxime in the resultant mixture may be varied. The ketone/oxime ratio is dependent upon the ratio between the amounts of ketone and hydroxylamine that are present in the reaction mixture, and also upon the degree of conversion of the ketone. While the mixed product may contain more ketone than oxime, e.g., may contain 60 to 80% by weight of cyclododecanone, the reaction with hydroxylamine is preferably continued until 10 to 50% by weight of cyclododecanone is present in the mixed product, i.e., until 50 to 90% of the cyclododecanone has been converted into cyclododecanone oxime, so that less excess capacity is needed in the process apparatus for the rearrangement reaction. However, the scope of the present invention contemplates 10 to 80% by weight of cyclododecanone in the mixed product.

The mixture of cyclododecanone and cyclododecanone oxime obtained in the reaction with hydroxylamine is subsequently reacted with hydrogen chloride in the presence of a polar organic solvent to convert the cyclododecanone/cyclododecanone oxime mixture into a mixture of ω-laurinolactam and cyclododecanone by the Beckmann rearrangement of cyclododecanone oxime into ω-laurinolactam.

A wide range of polar organic solvents of the water-immiscible type are suitable for the process of the present invention. Among solvents which may be utilized are the nitro compounds of hydrocarbons such as nitrobenzene, p-nitrotoluene, 1-nitropropane and nitrocyclohexane, halogenated hydrocarbons such as chlorobenzene, chloroform, trichloroethylene, butyl chloride and isopropyl chloride and nitriles such as acetonitrile, benzonitrile and adiponitrile. Mixtures of these solvents with each other or with hydrocarbons, such as toluene, xylene or benzene, for example, may also be used. The amount of solvent may be varied within wide limits. Large amounts such as 500 to 1000% by weight as well as small amounts such as 25 to 50% by weight with respect to the original amount of oxime may be used. If small amounts of solvents are used, part of the oxime may initially be present in a solid form as a suspension, and later go into solution in the course of the reaction. Part of the lactam formed may be present in the reaction mixture in solid form.

The temperature of the reaction with hydrogen chloride is preferably between 30 and 125° C. It is possible to start the reaction at a lower temperature such as at room temperature and increase the temperature during the course of the reaction.

No specific pressure limitations exist in the present process for producing ω-laurinolactam. Atmospheric pressure is usually used for the reaction with hydrogen chloride but higher pressures, e.g., 5, 10, 25, 50, 100 atmospheres or even higher may be used. If an elevated pressure is used, the reaction mixture may contain a larger amount of hydrogen chloride. Reduced pressures may also be used in the present process. In such cases, the temperature and pressure may be adjusted so that the reaction solvent boils during the reaction whereby part of it is discharged as vapor, condensed, and then recirculated or refluxed.

If desired, the reaction may be carried out in the presence of a catalyst. It has been found that substances such as phosgene and halogenated organic nitrogen compounds such as 1,3,5-trichloro-S-triazine and 2,4-dibromo-pyrimidine, amide chlorides such as 2-chloro-azacycloalkene, and amide chlorides such as 2-chloro-azo-alkene promote the formation of lactam. Although larger amounts of catalysts may be used if desired, a very small amount, such as 0.1 to 1 mole percent by weight of catalyst with respect to the oxime, will suffice.

Upon completion of the reaction, the solvent may be removed, for example, by distillation, and the residue may be distilled to separate the mixture of ω-laurinolactam and cyclododecanone. The distillation products from the mixture of ω-laurinolactam and cyclododecanone are a fraction of relatively pure laurinolactam and a fraction containing cyclododecanone and a small amount of laurinolactam. This impure fraction may be recycled and used as the starting product in the hydroxylamine-reaction process, as the laurinolactam need not be completely removed from the recycled products. The presence of entrained laurinolactam in the cyclododecanone which is reacted with hydroxylamine does not adversely affect the reaction. The recycled product may contain ½% or more by weight of laurinolactam; in fact, the amount of laurinolactam recycled may be as high as 20% or 50% or even higher, as the only limitation upon the amount of laurinolactam recycled is the capacity of equipment for the reaction of cyclododecanone with hydroxylamine. The separation of laurinolactam and cyclododecanone may be performed by other methods than distillation, e.g., by solvent extraction with a hydrocarbon in which the cyclododecanone dissolves.

EXAMPLE I

In a ½ liter reaction vessel provided with a stirrer, a reflux cooler and a gas-feed tube, 45 grams of cyclododecanone oxime containing 10% by weight of cyclododecanone are mixed with 100 ml. of acetonitrile, after which 15 grams of hydrogen chloride gas are introduced at room temperature.

The solution is then heated to 65–70° C. and, while additional hydrogen chloride is passed through, kept at this temperature for 15 minutes. At the end of this time period, the rearrangement reaction is essentially complete.

The acetonitrile and the hydrogen chloride are removed by distillation, and the crude laurinolactam is dissolved in 150 ml. of chloroform. The chloroform solution is washed with water, after which the chloroform is evaporated.

Subsequently, the cyclododecanone is separated from the laurinolactam by extraction with cyclohexane. 4.49 grams of cyclododecanone (recovery 99.7%) and 39.8 grams of laurinolactam (yield 98.2%) are obtained.

EXAMPLE II

In the manner of Example I, the rearrangement reaction is carried out with 41.7 grams of cyclododecanone oxime containing 5.5% by weight of cyclododecanone. A mixture of 150 ml. of toluene and 150 ml. of acetonitrile is used as solvent.

Upon completion of the reaction, the acetonitrile and the hydrogen chloride are removed by distillation, after which the still hot solution is washed with water. The toluene is removed by distillation, and the residue is then distilled under reduced pressure (1 mm. Hg), to separate the cyclododecanone and the laurinolactam. 2.25 grams of cyclododecanone (recovery 98.2%) and 38.6 grams of ω-laurinolactam (yield 98%) are obtained.

EXAMPLE III 45.5 grams of cyclododecanone (0.25 mole) are mixed with 35 ml. of an aqueous hydroxylamine sulphate solution containing 61 grams of hydroxylamine per liter (0.25 mole) in a ½ liter reaction vessel provided with a stirrer. The reaction mixture is heated to 90° C. with simultaneous stirring while the pH is kept at 6.5 by the introduction of gaseous ammonia. After 10 minutes the reaction is stopped by cooling the reaction mixture to room temperature and the resulting mixture of cyclododecanone oxime and cyclododecanone is separated from the aqueous solution by filtration. 47.3 grams of a mixture of cyclododecanone oxime and cyclododecanone containing 49.4% by weight of cyclododecanone are obtained.

This cyclododecanone oxime/cyclododecanone mixture is then mixed with 150 ml. of acetonitrile after which 20 grams of hydrogen chloride are introduced at room temperature with simultaneous stirring. The temperature is increased to 70° C. for fifteen minutes while hydrogen chloride is passed through the reaction mixture. At the end of this time period, the rearrangement reaction is completed. The acetonitrile and the hydrogen chloride are removed by distillation at 75–83° C. and the mixture of laurinolactam and cyclododecanone is dissolved in 200 ml. of hot 50–60° C. toluene. This solution is washed with hot water until it is acid-free. The toluene is removed by distillation at 110° C. after which the laurinolactam is separated from the cyclododecanone by distillation at a reduced pressure (1 mm. Hg) and a temperature of 85–90° C.

23.5 grams of ω-laurinolactam (corresponding to a yield of 97.5% with respect to the amount of converted cyclododecanone) and 23.2 grams of cyclododecanone (corresponding to a recovery of 99.1% with respect to the amount of unconverted cyclododecanone) are obtained.

EXAMPLE IV

The reaction with hydroxylamine described in Example III is repeated, except that the reaction mixture is stirred for 1 hour at 90° C. at a pH of 6.

48.9 grams of a mixed product containing 10.3% by weight of cyclododecanone is obtained. This product is reacted with hydrogen chloride in the same way as described in Example III.

After the acetonitrile is removed by distillation, the reaction mixture is dissolved in 200 ml. of chloroform. The chloroform solution is washed with water until it is acid-free, and the chloroform is removed by distillation. The cyclododecanone is separated from the ω-laurinolactam by extraction with cyclohexane. 43.0 grams of ω-laurinolactam (corresponding to a yield of 98.2% with respect to the amount of unconverted cyclododecanone) and 4.9 grams of cyclododecanone (corresponding to a recovery of 98% with respect to the amount of unconverted cyclododecanone) are obtained.

EXAMPLE V 54.6 grams of cyclododecanone (0.3 mole) are mixed with 81.2 ml. of aqueous hydroxylamine sulphate solution containing 61 grams of hydroxylamine per liter (0.15 mole) in a ¼ liter reaction vessel provided with a stirrer. The mixture is heated to 90° C. and kept at that temperature with stirring, for ½ hour. The pH of 6 is maintained by introduction of ammonia. At the end of this time period, no hydroxylamine is present in the reaction vessel.

The resulting mixed product of cyclododecanone oxime and cyclododecanone is separated from the aqueous salt solution by extraction with 200 ml. of hot (about 60° C.) xylene. The xylene extract is then added to 200 ml. of acetonitrile and saturated with hydrogen chloride at 60° C. The reaction mixture is then stirred for 15 minutes at 70–75° C. while passing hydrogen chloride through the mixture. At the end of this time period, the reaction is completed.

The acetonitrile and the hydrogen chloride are removed by distillation at a temperature of 75–83° C. and then traces of acid are removed from the hot solution by washing with water. The solution is then subjected to a distillation in which the xylene is first removed at a temperature of 135° C. The distillation is continued (1 mm. Hg) at a temperature of 85–170° C. and 29.5 grams of a distillate containing 26.9 grams of cyclododecanone and 2.6 grams of ω-laurinolactam. Subsequently at a temperature of 170–175° C. 26.1 grams of laurinolactam are obtained. These product yields correspond to a yield of 97% of laurinolactam, with respect to the amount of unconverted cyclododecanone, and a recovery of 98.5% of cyclododecanone, with respect to the amount of unconverted cyclododecanone.

It will be understood the practice of this invention is not confined to the specific examples set forth above, but is only limited by the spirit and scope of the following claims.

I claim:
1. In the process for the preparation of ω-laurinolactam from cyclododecanone oxime, in which the oxime is brought into reaction with hydrogen chloride in the presence of a polar organic solvent, the improvement consisting essentially in using as the initial product cyclododecanone oxime in admixture with more than 0.5% by weight of cyclododecanone.

2. The process of claim 1, wherein the cyclododecanone oxime contains more than 3% by weight of cyclododecanone.

3. The process of claim 1, wherein the cyclododecanone oxime contains more than 10% by weight of cyclododecanone.

4. The process of claim 1, wherein the cyclododecanone is separated from the ω-laurinolactam after the reaction.

5. The process of claim 1, wherein the cyclododecanone oxime containing cyclododecanone is produced by reacting cyclododecanone with less than a stoichiometric amount of an aqueous solution of hydroxylamine until a mixed product of cyclododecanone oxime and 10–80% by weight of cyclododecanone, based on the weight of mixed product, is obtained, and separating the cyclododecanone oxime and the cyclododecanone from the aqueous solution.

6. The process of claim 5, wherein the reaction of cyclododecanone with hydroxylamine is at a pH in the range 4 to 7.

7. The process of claim 6, wherein the reaction of cyclododecanone with hydroxylamine is continued until 50–90% of the cyclododecanone has been converted to cyclododecanone oxime.

8. The process of claim 5, wherein the cyclododecanone is reacted with ¼ to ¾ mole of hydroxylamine per mole of cyclododecanone.

9. The process of claim 5, wherein the cyclododecanone, which is separated from the ω-laurinolactam, contains at least ½% by weight of ω-laurinolactam and is recycled to be used again as a starting product.

References Cited

UNITED STATES PATENTS

| | | | |
|---|---|---|---|
| 2,249,177 | 7/1941 | Schlack | 260—239.3 |
| 2,756,258 | 7/1956 | Wise | 260—566 |
| 3,060,173 | 10/1962 | Von Schick et al. | 260—239.3 |

OTHER REFERENCES

Chapman "J. Chem. Soc." pp. 1223–9 (1935).

HENRY R. JILES, *Primary Examiner.*

R. T. BOND, *Assistant Examiner.*